United States Patent
Oster

(10) Patent No.: US 6,843,356 B2
(45) Date of Patent: Jan. 18, 2005

(54) ROTATING ACTUATOR

(75) Inventor: Christoph Oster, Lüdenscheid (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/667,800

(22) Filed: Sep. 22, 2003

(65) Prior Publication Data

US 2004/0093968 A1 May 20, 2004

Related U.S. Application Data

(63) Continuation of application No. PCT/EP02/04481, filed on Apr. 24, 2002.

(30) Foreign Application Priority Data

Apr. 26, 2001 (DE) .......................... 101 20 618

(51) Int. Cl.[7] .......................... H01H 19/14; G01D 11/16
(52) U.S. Cl. ........................ 192/215; 192/138; 200/564; 345/184
(58) Field of Search ............................. 192/215, 223.1, 192/139, 138, 142 R; 200/564; 345/184; 158/31, 69, 76, 77 R, 163

(56) References Cited

U.S. PATENT DOCUMENTS

| 4,064,981 | A | * | 12/1977 | House et al. ............... 192/141 |
| 4,641,737 | A | * | 2/1987 | Gillingham et al. ........ 192/141 |
| 5,012,056 | A | * | 4/1991 | Abel et al. .................... 200/519 |
| 5,141,092 | A | * | 8/1992 | Bevans et al. .............. 192/139 |
| 5,956,016 | A | | 9/1999 | Kuenzner et al. |
| 6,339,419 | B1 | * | 1/2002 | Jolly et al. .................... 345/156 |
| 6,480,752 | B1 | | 11/2002 | Blume et al. |
| 6,613,997 | B2 | * | 9/2003 | Oster et al. .................. 345/184 |

FOREIGN PATENT DOCUMENTS

| DE | 196 46 226 A1 | 11/1996 |
| DE | 197 12 049 A1 | 3/1997 |
| DE | 101 53 002 A1 | * 6/2002 |
| EP | 0 565 143 A2 | 1/1993 |
| WO | WO 02/18882 A1 | * 3/2002 |

* cited by examiner

Primary Examiner—Rodney H. Bonck
(74) Attorney, Agent, or Firm—Brooks Kushman P.C.

(57) ABSTRACT

A rotating actuator includes a shaft (24) and a mechanical stop device (23) for generating a stop to limit the rotation of the shaft in a direction of rotation. The stop device acts upon the shaft to prevent the shaft from rotating further in the direction of rotation by blocking the shaft using a stop device acting mechanically on the shaft while enabling rotation of the shaft in a direction of rotation counter to the stop with slip in a stop arrangement. The slip is configured such that movement of the shaft in the direction of rotation counter to the stop is detectable. The stop device may include two independently triggered, mechanical stop devices. One stop device acts as a stop for limiting the rotation of the shaft to the right, and the other stop device acts as a stop for limiting the rotation of the shaft to the left.

13 Claims, 3 Drawing Sheets

ROTATING ACTUATOR

CROSS-REFERENCE TO RELATED APPLICATIONS

This is a continuation of International Application PCT/EP02/04481, published in German, with an international filing date of Apr. 24, 2002.

BACKGROUND OF THE INVENTION

1. Field of the Invention

The present invention relates to a rotating actuator having a rotatably mounted control shaft and an activatable mechanical stop device for generating a stop to limit the rotation of the control shaft in one or the other direction of rotation, and with an angle detection device for detecting a rotation of the control shaft.

2. Background Art

Rotating actuators are used, for example, in data input devices, in which the cursor can be controlled in various menu levels by turning the rotating actuator and, if necessary, by pressing or swiveling said rotating actuator. For example, such a rotating actuator can be part of a so-called joystick.

One such rotating actuator is known from DE 197 12 049 A1. In this previously known rotating actuator, the gearing of a device for generating a haptic interface is coupled with the control shaft. This device is an electric motor which, when correspondingly actuated, exposes the control shaft to a torque opposite the rotation of the control shaft. Various haptic interfaces can be provided depending on the triggering or activation of the electric motor both in terms of the current intensity acting on the electric motor and as a function of the current rotational angle position of the control shaft. An angle detection device is allocated to the rotating actuator to determine the current rotational angle position.

The rotating actuator can also be operated without triggering the electric motor, and hence without any haptic interface to effect the rotation. Therefore, it is possible to operate the same rotating actuator both without and with a predetermined haptic interface or with varying haptic interfaces as a function of the respective mode of the rotating actuator.

This is advantageous relative to those rotating actuators having a haptic interface-generating device that resembles a mechanical latch with a latching cam plate and one or more latching elements that engage in the latching cam plate to generate a haptic interface when turning the handle. In these mechanical haptic interface-generating devices, the haptic interface cannot be enabled or disabled and, in particular, the haptic interface also cannot be reversed.

The rotating actuator known from this document also makes it possible to simulate an end stop by appropriately supplying current to the electric motor. However, the disadvantage to this configuration is that simulating an end stop in this rotating actuator not only results in a high current consumption, but that the counteracting force provided by the electric motor to simulate the end stop can also be surmounted. Providing the user with an end stop that cannot be so easily surmounted would require that appropriately conceived electrical and electronic components be made available, something which is unfeasible, at least in the automotive industry. In addition, the current required for this purpose is sometimes not always available in a motor vehicle, for example.

DE 196 46 226 A1 discloses another rotating actuator having a stop device that can be enabled and disabled. The control shaft is rigidly connected to a wheel provided with pockets in which the ball of a latching device engages, so that the wheel is latched and turned. A compression spring acts on the ball, and the spring is also arranged so that it is acted on by an electromagnet, with which the spring bias acting on the ball can be adjusted. The electromagnet itself rests against an abutment that is fixed relative to the control shaft. This abutment is situated radially to the control shaft. This stop device can be set in such a way that the electromagnet moves the spring to a blocking position, as a result of which the ball engages in a pocket of the wheel allocated to the control shaft like a bolt and blocks rotation. The ball is then held in such a pocket in a precisely form-fitting manner.

The perceived disadvantage to this stop device that acts mechanically on the control shaft is that a stop can only be established in those positions of the wheel with its pockets relative to the ball in which the ball can engage in a pocket of the wheel. Therefore, a stop cannot be produced in intermediate positions. In order to again disable the enabled stop device that impedes the rotation of the control shaft so that the control shaft can be turned once more, and hence actuated, the electromagnet must be supplied with less or no current beforehand via additional actuation, thereby making it possible to further latch and turn the control shaft. It is inadvisable to perform such an additional, active operation.

SUMMARY OF THE INVENTION

Proceeding from this discussed prior art, the object of the present invention is therefor to develop a rotating actuator as mentioned at the outset in such a way as to generate a stop to limit a direction of rotation that cannot be easily surmounted therein given a rotating actuator in quasi-arbitrary rotational angle positions of the control shaft.

This object is achieved according to the present invention by virtue of the fact that the stop device includes two individual and independently triggered stop mechanisms that mechanically act on the control shaft, of which one stop mechanism provides a stop for limiting a rotation of the control shaft to the right, while another stop mechanism is provided to limit a rotation of the control shaft to the left.

Further, this object is achieved according to the present invention by virtue of the fact that, in order to limit the rotation of the control shaft in a direction of rotation, the activated stop device is designed to act on the control shaft in such a way as to prevent the control shaft from executing another rotation in its direction of rotation and to be blocked by the stop device by means of a stop associated with a stop device acting mechanically on the control shaft, and maintain the rotation of the control shaft in a direction of rotation counter to the stop with slip in the stop arrangement. The slip provided by the stop arrangement is dimensioned in such a way that a movement by the control shaft in the direction of rotation counter to the stop can be detected by the angle detection device.

In the rotating actuator according to the first proposed solution, the stop device includes two individual and independently triggered stop mechanisms that are arranged in such a way as to each act mechanically on the control shaft in one direction in order to prepare or generate a stop for limiting the rotation of the control shaft. This measure causes the stop device to become activated or enabled effective only for the direction of rotation that requires a stop given the current use of the rotating actuator.

By contrast, such a stop mechanism does not act in the direction of rotation of the control shaft counter to the current direction of rotation, so that the control shaft can be readily actuated in the direction of rotation acting counter to the stop. Therefore, the control shaft is not prevented from moving in a direction of rotation away from the enabled stop mechanism, and its movement can be detected by the angle detection device. Once such a rotation of the control shaft away from the set stop has been detected, the initially activated stop mechanism can be disabled again, so that the control shaft can subsequently be turned in the other, originally limited direction of rotation once again. The two stop mechanisms for limiting the right or left rotation of the control shaft are designed to act mechanically on the control shaft.

As opposed to known prior art, then, the subject matter of this rotating actuator does not require an additional actuating step to again release the enabled stop device. It is enough to conventionally actuate the control shaft in the direction of movement away from the stop to release the stop.

According to the additional proposed solution, the rotation of the control shaft is limited by a single stop device, which is used to block a rotation of the control shaft in both directions. However, the stop device impedes the control shaft with slip in the direction away from the rotational direction-limiting stop of a stop arrangement that acts mechanically on the control shaft. In this case, the provided slip in this direction is dimensioned in such a way as to enable a rotation of the control shaft or handle in the direction leading away from the active stop, at least to an extent that the angle detection device can detect this rotation.

As a consequence, the subject matter of this rotating actuator also makes it possible to cancel the stop effect in a direction of rotation just by rotating the rotating actuator away from the stop. Conversely, the stop device blocks the other direction of rotation of the control shaft accordingly.

Both introduced rotating actuators can be designed in such a way relative to their stop device or devices as to include an annular element that concentrically envelops the control shaft and is coupled to the rotation of the control shaft. In addition, such a stop device has allocated to it an activation device, fixed in place relative to a rotation of the annular element, which activates the stop device to block or impede the rotation of the annular element.

For example, such an activation device can be an open ring concentrically enveloping the annular element like a clip, whose free ends are connected via the activation device. After the activation device has been activated, this clip-like ring is rigidly connected with the annular element enveloping the control shaft, either non-positively or positively. The activation device can be an electromagnet or a memory metal that can be heated with a heating device, for example.

In the case of a rotating actuator according to the second proposed solution, the stop arrangement can be a stop unit allocated to the control shaft or annular element. The respective other element, i.e., annular element or control shaft, has allocated to it a pocket open to the respective other element, i.e., control shaft or annular element, in which the stop unit engages. The right and left limits of such a pocket then form the stops for the stop unit. The necessary slip in the stop arrangement is generated by a corresponding free space between the stop unit and its lateral limits. In this case, it may be advisable to essentially center the stop unit in such a stop arrangement, at least when not actuating the handle. This can be realized, for example, by arranging spring elements braced against the stop unit between the right and left limits of such a pocket and the stop unit.

In a particularly preferred configuration, such a rotating actuator has not only a stop device, but also a device that can be enabled and disabled to generate a haptic interface when the handle is turned. This haptic interface-generating device is advantageously designed like a mechanical latch, which yields a precisely predetermined haptic interface when the control shaft is turned.

This rotating actuator also includes an activation device, advantageously electromagnetically actuated, which acts on at least one of the two elements that mechanically interact to generate the haptic interface, i.e., latching cam plate or latching element. Actuating or triggering the activation device makes it possible to enable or disable interaction between the latching cam plate and the one or more latching elements. The activation device can be set up to act on the one or more latching elements, for example, allowing them to engage in the cam plate or lift away from the latching cam plate, depending on the design of the activation device.

The activation device can correspondingly also be set up to act on the latching cam plate or the element carrying the latching cam plate. In this configuration, the one or more spring-biased latching elements engage in the latching cam plate. The latching cam plate is advantageously allocated to an annular element that concentrically envelops the control shaft. When the control shaft is turned without the activation device actuated, the latching cam plate is also made to rotate by the latching element that engage in the latching cam plate, so that no haptic interface can be discerned in this rotating actuator mode.

Only after the activation device has been triggered is the element carrying the latching cam plate fixed relative to a rotation of the control shaft, so that when the control shaft is subsequently turned, the one or more latching elements are guided by the latching cam plate to generate the desired haptic interface. The advantage to such a configuration is that it prevents undesired control shaft movements caused by a latching element that might not precisely engage in a recess when switching from one haptic interface to another haptic interface. Such haptic interface-induced movements of the control shaft are undesired in some applications.

BRIEF DESCRIPTION OF THE DRAWINGS

The present invention shall be described below based on exemplary embodiments with reference to the attached Figures which include.

DETAILED DESCRIPTION OF THE PREFERRED EMBODIMENT(S)

Figure 1:
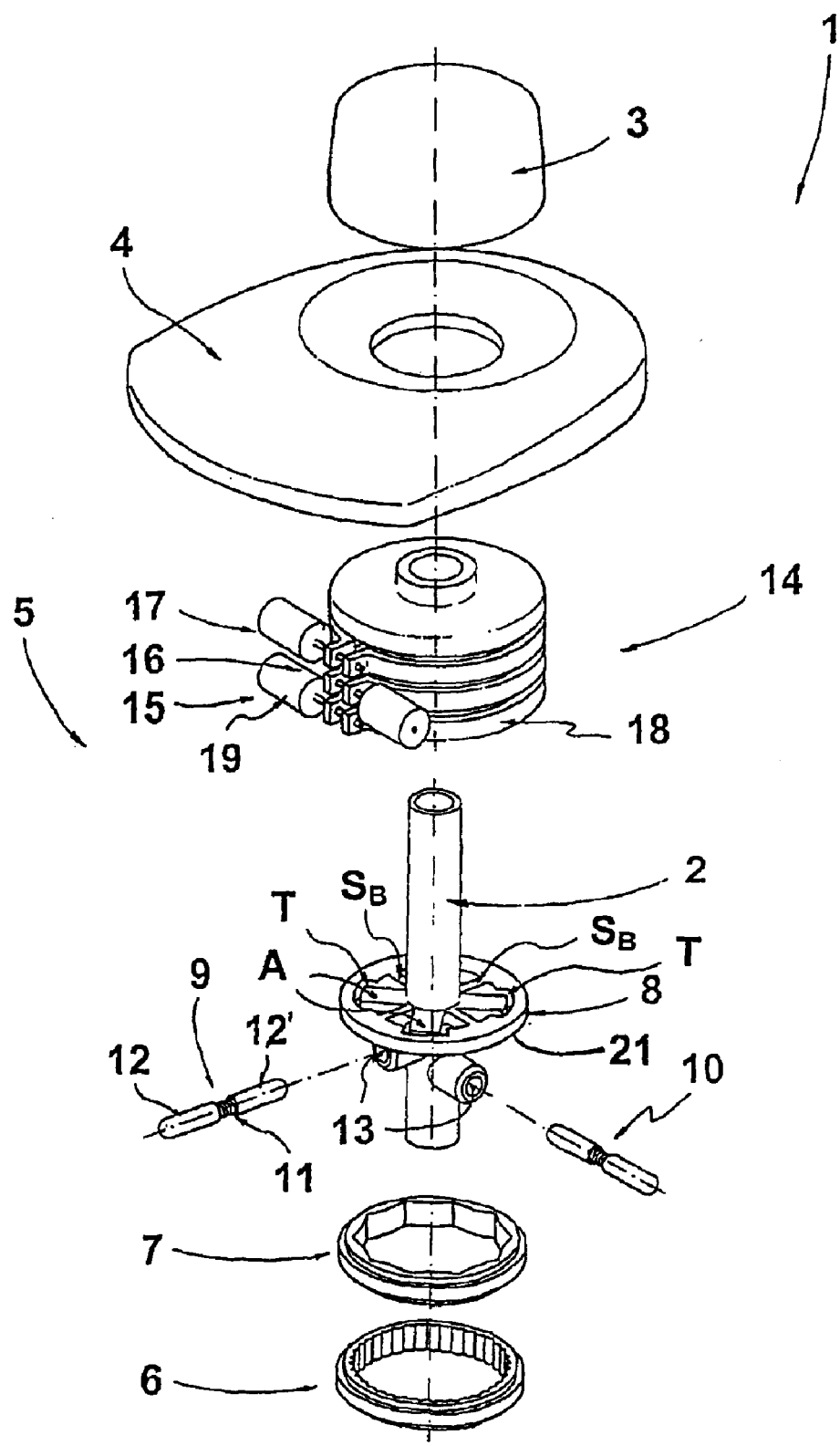
FIG. 1 illustrates an exploded perspective view of a rotating actuator in accordance with the present invention.

Referring now to FIG. 1, a rotating actuator 1 in accordance with the present invention is shown. Rotating actuator 1 includes a rotatable control shaft 2 at the operator end, of which a turning knob 3 is provided as a handle. Control shaft 2 passes through a mask 4 so that the control shaft segments located below turning knob 3 are covered by the mask.

Rotating actuator 1 also includes a haptic perception signal generating device 5 (i.e., haptic interface-generating device). In the embodiment depicted in FIG. 1, haptic interface-generating device 5 includes, for example, two latching cam plate rings 6 and 7, a brake flange 8 connected to control shaft 2, and latching sleeve assemblies 9 and 10. Latching sleeve assemblies 9 and 10 are offset by 90° relative to each other and each include two opposed latching bolts 12 and 12'. Latching bolts 12 and 12' are placed opposite to each other and are braced against each other by a compression spring 11. Latching bolts 12 and 12' are each arranged along with compression spring 11 in a sleeve-like receptacle 13 of control shaft 2. Latching cam plate rings 6 and 7 are float-mounted relative to the rotation of control shaft 2.

Haptic interface-generating device 5 further includes three activation devices 15, 16, and 17 which are combined in a clamping bell 14. Activation devices 15, 16, and 17 are developed similar to a tension or clamping ring 18—as shown in FIG. 1 with respect to activation device 15—and can be electromagnetically activated. Each activation device 15, 16, and 17 hence includes a respective clamping ring 18, as identified on activation device 15 in FIG. 1, along with an electromagnet 19 for actuating clamping ring. When electromagnet 19 is actuated, clamping ring 18 is tightened. The remaining activation devices 16 and 17 are designed correspondingly.

Clamping rings 18 of activation devices 15 and 16 envelop or surround latching cam plate rings 6 and 7. In this case, the inner diameter of clamping rings 18 slightly exceeds the outer diameter of latching cam plate rings 6 and 7. Actuating electromagnet 19 of an activation devices 15 and 16 causes the respective latching cam plate ring 6 and 7 to become fixed because the cam plate ring 6 and 7 is held non-positively in clamping ring 18. Clamping bell 14 with its activation devices 15, 16, and 17 is rigidly fixed in place relative to the rotational motion of control shaft 2.

Activation device 17 interacts with brake flange 8 in a corresponding manner, so that actuating electromagnet 19 of this activation device 17 increases the torque necessary to cause or to prevent and block the rotational movement of control shaft 2. The latter case will be explained in greater detail later.

Figure 2:
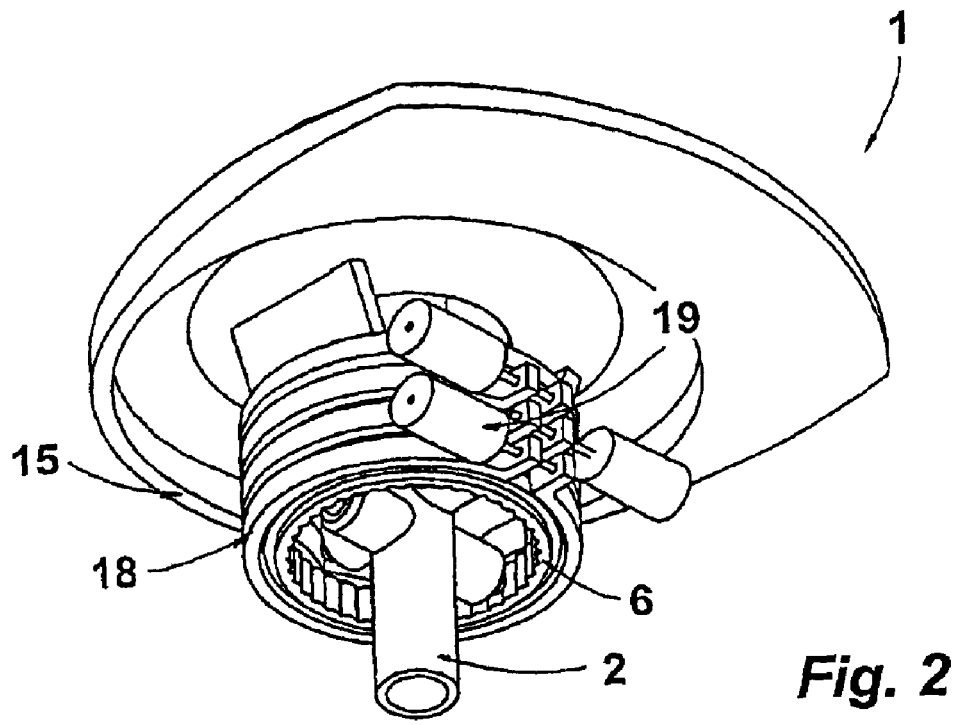
FIG. 2 illustrates a perspective view of the mounted rotating actuator of FIG. 1, viewed in the direction of a haptic interface-generating device.

With rotating actuator 1 mounted in place, the two respective diametrically opposed latching bolts 12 and 12' each engage in the latching cam plate of one of latching cam plate rings 6 and 7. This is discernible from a bottom view shown on FIG. 2.

When rotating actuator 1 is rotated without actuating electromagnet 19 of an activation device 15, 16, and 17, control shaft 2 can be rotated without a haptic interface being provided by latching cam plate rings 6 and 7. Spring-biased latching bolts 12 and 12' engage in the latching cam plate of each latching cam plate ring 6 and 7, moving them along when control shaft 2 rotates. Clamping ring 18 closes during the activation of electromagnet 19 of an activation device, e.g., electromagnet 19 of activation device 15, so that latching cam plate ring 6 incorporated by clamping ring 18 is fixed relative to a rotation of control shaft 2.

When control shaft 2 is rotated, the two latching bolts 12 and 12' are now moved in the latching cam plate of latching cam plate ring 6, so that a haptic rotation takes place corresponding to the latching cam plate contained in latching cam plate ring 6.

In order to realize a haptic stop, activation device 17 can be triggered in such a way that tightening clamping ring 18 of this activation device 17 prevents a rotation of control shaft 2. Activation devices 15, 16 and 17 can be triggered individually or by group to generate varying haptic interfaces.

Figure 3:
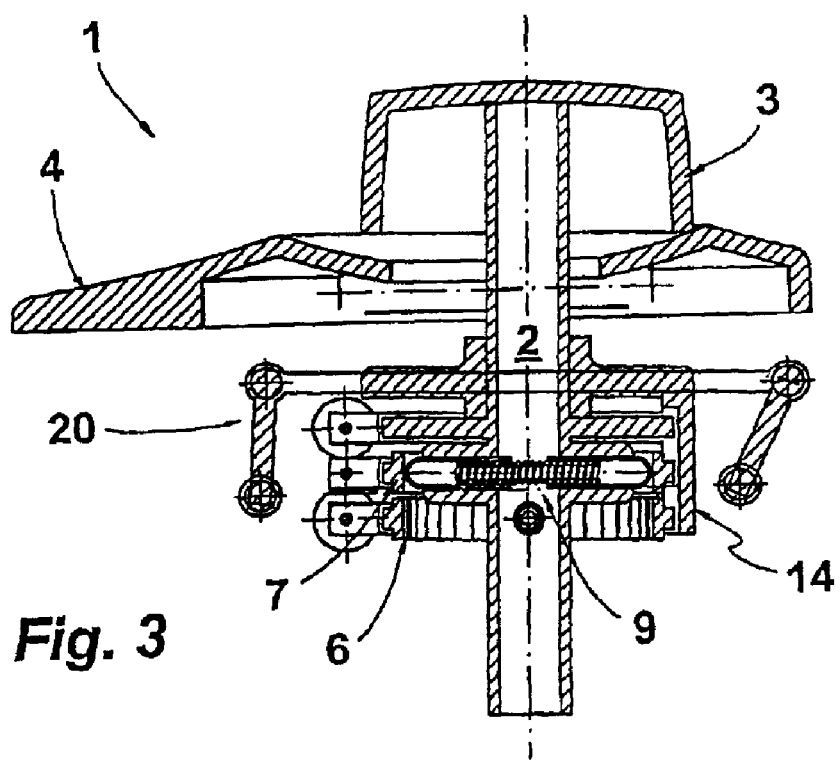
FIG. 3 illustrates a longitudinal section through the rotating actuator shown in FIG. 2, as applied in a joystick.

FIG. 3 illustrates a longitudinal section of rotating actuator 1, wherein the rotating actuator is part of a joystick (not shown in any greater detail) in this configuration. Control shaft 2, and hence rotary knob 3, are mounted so that they can rotate along with clamping bell 14 containing activation devices 15, 16, and 17. FIG. 3 illustrates rotating actuator 1 rotated out of its neutral position.

The haptic capabilities to be realized with simple means for the rotating actuator 1 enable it to be part of a joystick (see FIG. 3) without much effort, because only a single assembly—clamping bell 14—is pivoted. FIG. 3 symbolically represents a linkage 20 that guides the pivoting movement of control shaft 2.

Brake flange 8 shown on FIG. 1 includes an annular element 21. Annular element 21 envelops control shaft 2, and is physically connected with control shaft 2 via several elastic bending spokes $S_B$. Bending spokes $S_B$ permit a relative rotation of annular element 21 with respect to control shaft 2. Annular element 21 has incorporated into it pockets T that open toward control shaft 2, in which the free end of a stop beam A engages. Stop beam A is rigidly connected with control shaft 2 as the stop unit. The lateral limits of such a pocket T respectively constitute the right and left stops relative to a stop beam A. Therefore, the two stops formed by a pocket T represent a stop arrangement.

A rotation of annular element 21 is blocked when activation device 17 is activated. Control shaft 2 can hence only still be moved in the slip range with which a stop beam A engages in a pocket T. On FIG. 1, stop beams A are roughly centrally located inside each pocket. Once activation device 17 becomes active with the objective of providing a stop for the rotation of control shaft 2, the respective stop beams A abut against a stop provided by each pocket T, namely against the one intended to limit the currently executed rotation of the control shaft. With activation device 17 activated, and the rotation of annular element 21 thus blocked, control shaft 2 can then be turned back by the entire remaining slip in the direction opposite the stop, even though the stop unit is activated, and a rotation of the control shaft is essentially blocked.

FIG. 1 does not show an angle detection device that can be used to determine the rotational angle position of control shaft 2. Such an angle detection device can be mechanical or optoelectronic in design, for example. In any event, the resolution of the angle detection device is matched with the slip present between the stop beams A and the stops of a stop arrangement in such a way that such an aforementioned rotation of control shaft 2 counter to a stop can be detected by the angle detection device. The detection of such a rotation of control shaft 2 subsequently causes activation device 17, and hence the entire stop mechanism, to become deactivated so that control shaft 2 is again released in terms of its ability to rotate.

Figure 4:
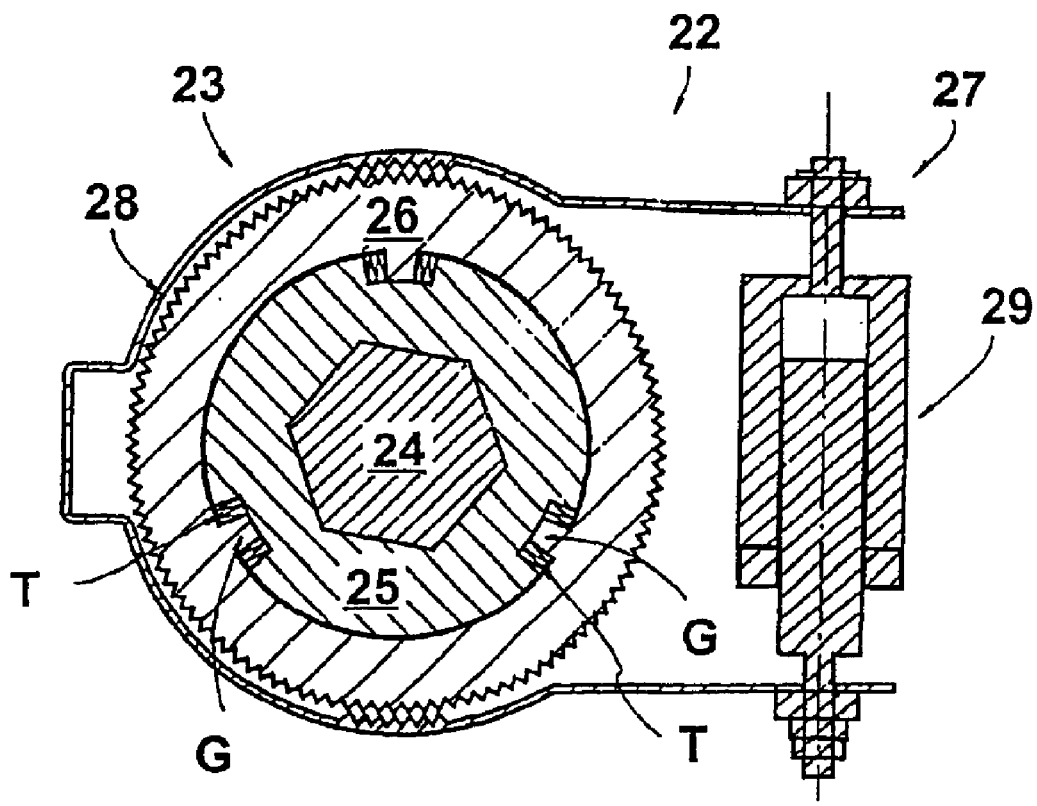
FIG. 4 illustrates a cross-sectional view through a rotating actuator having a stop device in accordance with another embodiment of the present invention, the stop device being deactivated.

FIG. 4 illustrates a rotating actuator 22 in accordance with another embodiment of the present invention. Rotating actuator 22 is basically set up similarly to rotating actuator 1 illustrated in FIGS. 1–3. Stop device 23 of rotating actuator 22 differs in design from the configuration of rotating actuator 1.

Stop device 23 includes a first annular element 25 rigidly connected with a control shaft 24. An annular element 25 carries several pockets T that open radially to the outside to each hold a stop unit G of a second outer annular element 26 that concentrically envelops the inner annular element 25. The stop units G are designed as cogs, and each engage in one pocket T. In terms of the inside diameter of a pocket T, the stop units G are dimensioned in such a way that each stop unit G is accommodated in a pocket T with slip in the direction of rotation. Compression springs are arranged between the lateral limits of a pocket T in the direction of rotation and a stop unit G in order to achieve a centered arrangement of stop units G in the pockets T, in particular when control shaft 24 is not actuated. Outer annular element 26 is concentrically enveloped by an activation device 27, which includes an open ring 28 arranged like a clip and an electromagnet 29. Outer annular element 26 has an array of teeth. A complementary array of teeth is arranged inside on the clip-like ring 28. FIG. 4 illustrates activation device 27 turned off, so that control shaft 24 can be freely rotated.

Figure 5:
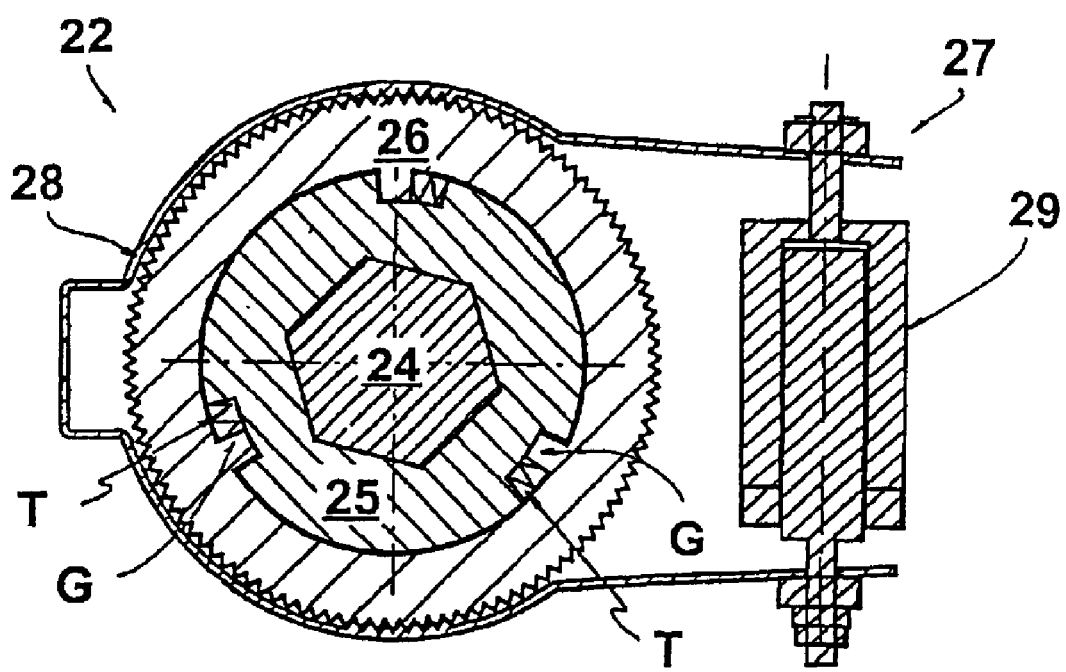
FIG. 5 illustrates the rotating actuator shown in FIG. 4 with the stop device being activated.

To bring about a stop, electromagnet 29 is triggered, so that the clip-like ring 28 closes, and the array of teeth of ring 28 meshes with that of the outer annular element 26. Because activation device 27 is fixed in terms of a rotation of control shaft 24, and in particular of annular element 26 as well, a rotation of control shaft 24 is impeded in this position, which is shown in FIG. 5.

Control shaft 24 was used beforehand to execute a counterclockwise rotation, as evident from the stop units G abutting the left stops of the pockets T. The spring arranged on this side has assumed a blocking function. The remaining slip with which each stop unit G is arranged in a pocket T is completely in the direction of rotation away from the active stop of a pocket in the position of control shaft 24 shown on FIG. 5. Control shaft 24 remains movable in this direction up to the additional stop of each pocket T. As with rotating actuator 1 illustrated in FIGS. 1–3, detecting a rotation within this slip using an angle detection device (not shown) also causes activation device 27 to be released and turned off, so that control shaft 24 can subsequently be freely moved again.

The stop devices shown in the embodiments are set up in such a way that the stop units always engage in the stop arrangement. Given a respective control shaft that is freely rotating, the stop arrangement therefore turns along with the control shaft. When a stop device is activated to limit the rotation of the control shaft, one of the two elements, i.e., stop unit or stop arrangement, is fixed in place to prevent the control shaft from rotating further. The stop device can be activated as a function of the respectively current status of the control shaft position, which is monitored by a controller via the angle detection device. In this way, the control shaft can go through several menu items as it would a list, with a stop being set up at the end of the list. It is also possible, given a change in the list length, to use software to alter the positions in which the stops are set or the stop devices are activated.

Heatable memory metals can also be used as activation devices in place of the illustrated electromagnets, in particular for the activation device responsible for the haptic interface. The advantage to using such activation devices is that they operate noiselessly.

Reference List

1 Rotating actuator
2 Control shaft
3 Rotary knob, handle
4 Mask
5 Haptic interface-generating device
6 Latching cam plate ring
7 Latching cam plate ring
8 Brake flange
9 Latching sleeve assembly
10 Latching sleeve assembly
11 Compression spring
12, 12' Latching bolts
13 Receptacle
14 Clamping bell
15 Activation device
16 Activation device
17 Activation device
18 Clamping ring
19 Electromagnet
20 Linkage
21 Annular element
22 Rotating actuator
23 Stop device
24 Control shaft
25 Annular element
26 Annular element
27 Activation device
28 Clip-like ring
29 Electromagnet
A Stop beam
G Stop unit
$S_B$ Bending spoke
T Pocket While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A rotating actuator comprising:
   a shaft rotatable in clockwise and counter-clockwise directions of rotation;
   a stop device having an annular element, a bending member, and a stop member, the annular element concentrically envelops the shaft, the bending member connects the annular element to the shaft such that the annular element is rotatable to rotate as the shaft rotates, the bending member being bendable to permit a relative rotation of the shaft with respect to the annular element when rotation of the annular element is blocked, the stop member having a free end and a connecting end, the connecting end of the stop member is connected to the shaft;
   the annular element having a pocket facing the shaft, the free end of the stop member engages the pocket, the pocket having first and second stops which form a slip range for the free end of the stop member to move within as the shaft rotates when the rotation of the annular element is blocked; and
   an activation device fixed in place relative to rotation of the shaft, the activation device being operable with the stop device to block rotation of the annular element upon activation such that the free end of the stop member moves within the slip range as the shaft rotates in the clockwise direction and then abuts the first stop thereby blocking further rotation of the shaft in the clockwise direction;

wherein, while the rotation of the annular element is blocked and the free end of the stop member abuts the first stop such that further rotation of the shaft in the clockwise direction is blocked, the shaft is rotatable in the counter-clockwise direction as the free end of the stop member moves within the slip range from the first stop toward the second stop until the free end of the stop member abuts the second stop.

2. The rotating actuator of claim 1 further comprising:

a haptic interface generating device for generating a haptic interface when the shaft is rotated, the haptic interface generating device including a latching cam plate and latching elements that engage in the latching cam plate, the haptic interface generating device further including a second activation device operable for acting on the latching cam plate to enable interaction between the latching elements and the latching cam plate to generate a haptic interface shaped by the latching cam plate during rotation of the shaft.

3. The rotating actuator of claim 2 wherein:

the second activation device includes a clamping ring which surrounds and contacts the latching cam plate, wherein the clamping ring fixes the latching cam plate in place relative to the shaft in order to generate the haptic interface shaped by the latching cam plate during rotation of the shaft when the activation device is activated.

4. The rotating actuator of claim 3 wherein:

the clamping ring is an electromagnetically actuated clamping ring.

5. The rotating actuator of claim 2 further comprising:

a second haptic interface generating device for generating a second haptic interface when the shaft is rotated, the second haptic interface generating device including a second latching cam plate and a second latching element that engages in the second latching cam plate, the second haptic interface generating device further including a third activation device operable for acting on the second latching cam plate to enable interaction between the second latching element and the second latching cam plate to generate a second haptic interface shaped by the second latching cam plate during rotation of the shaft.

6. The rotating actuator of claim 5 wherein:

the latching cam plates are arranged adjacently in different planes along the longitudinal axis of the shaft.

7. A rotating actuator comprising:

a shaft rotatable in clockwise and counter-clockwise directions of rotation; and an activatable mechanical stop device for generating a stop to limit the rotation of the shaft in one of or the other one of the directions of rotation;

wherein in order to limit the rotation of the shaft in either one of the directions of rotation the stop device includes a stop arrangement which acts mechanically upon the shaft to prevent the shaft from rotating further in one of the directions of rotation while providing slip to allow rotation of the shaft in the other one of the directions of rotation, wherein the slip enables sufficient rotation of the shaft in the other one of the directions of rotation for detection by an angle detection device;

wherein the stop device includes an annular element that concentrically envelops the shaft, the annular element being coupled to the shaft to rotate therewith, the stop device further including an activation device fixed in place relative to rotation of the shaft, wherein the activation device activates in order to block the rotation of the annular element and thereby generate the stop to limit the rotation of the shaft.

8. The rotating actuator of claim 7 further comprising:

a haptic interface generating device for generating a haptic interface when the shaft is rotated, the haptic interface generating device including a latching cam plate and latching elements that engage in the latching cam plate, the haptic interface generating device further including a second activation device operable for acting on the latching cam plate to enable interaction between the latching elements and the latching cam plate to generate a haptic interface shaped by the latching cam plate during rotation of the shaft.

9. The rotating actuator of claim 8 wherein:

the second activation device includes a clamping ring which surrounds and contacts the latching cam plate, wherein the clamping ring fixes the latching cam plate in place relative to the shaft in order to generate the haptic interface shaped by the latching cam plate during rotation of the shaft when the activation device is activated.

10. The rotating actuator of claim 9 wherein:

the clamping ring is an electromagnetically actuated clamping ring.

11. The rotating actuator of claim 8 further comprising:

a second haptic interface generating device for generating a second haptic interface when the shaft is rotated, the second haptic interface generating device including a second latching cam plate and a second latching element that engages in the second latching cam plate, the second haptic interface generating device further including a third activation device operable for acting on the second latching cam plate to enable interaction between the second latching element and the second latching cam plate to generate a second haptic interface shaped by the second latching cam plate during rotation of the shaft.

12. The rotating actuator of claim 11 wherein:

the latching cam plates are arranged adjacently in different planes along the longitudinal axis of the shaft.

13. The rotating actuator of claim 11 wherein:

the activation devices are combined into an assembly.

* * * * *